Oct. 15, 1940. J. R. STRICKLEN 2,218,138
APPARATUS FOR MANUFACTURING INSULATED WIRE OR THE LIKE
Filed Dec. 15, 1938 2 Sheets-Sheet 2
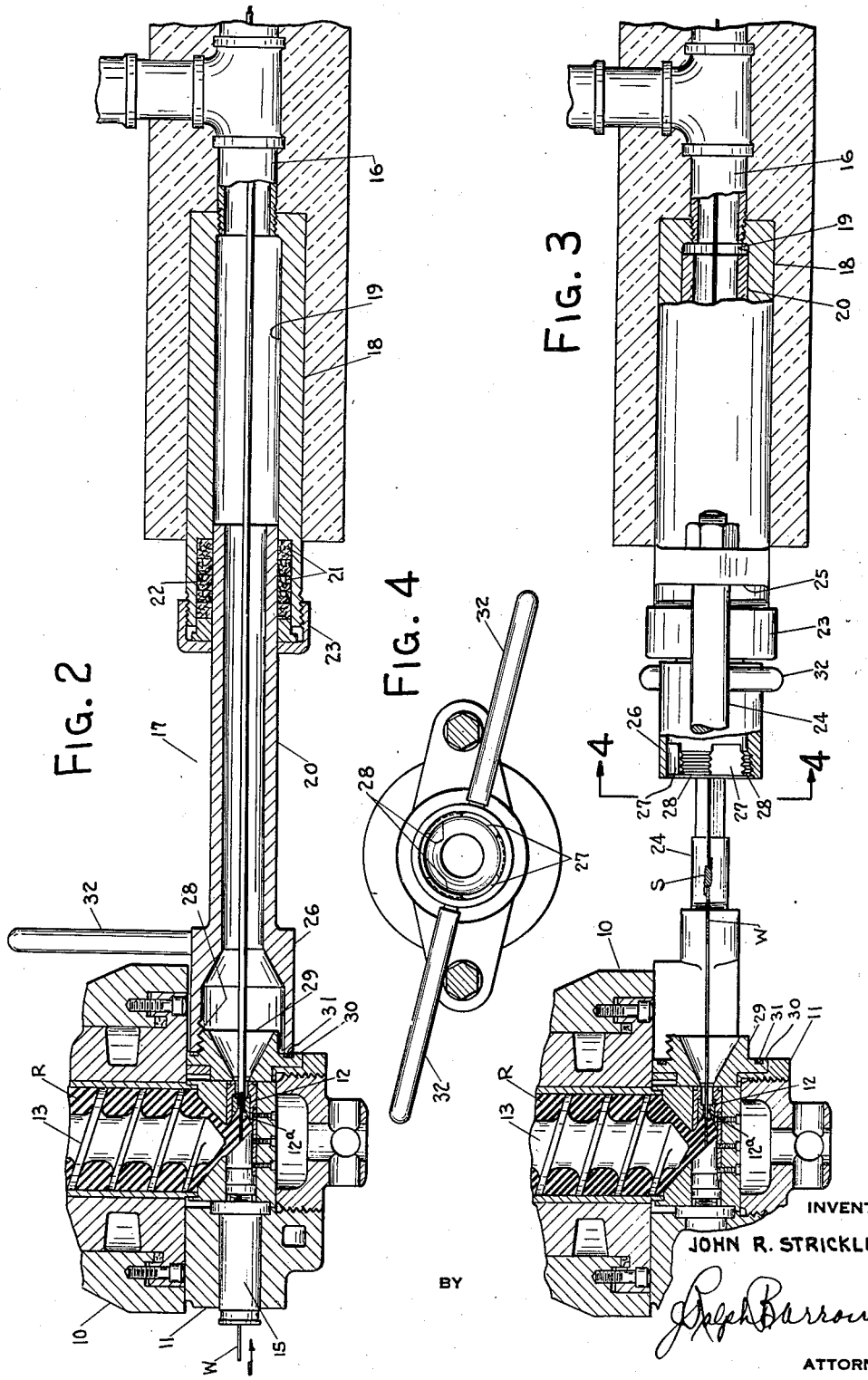
INVENTOR
JOHN R. STRICKLEN
BY
ATTORNEY Patented Oct. 15, 1940

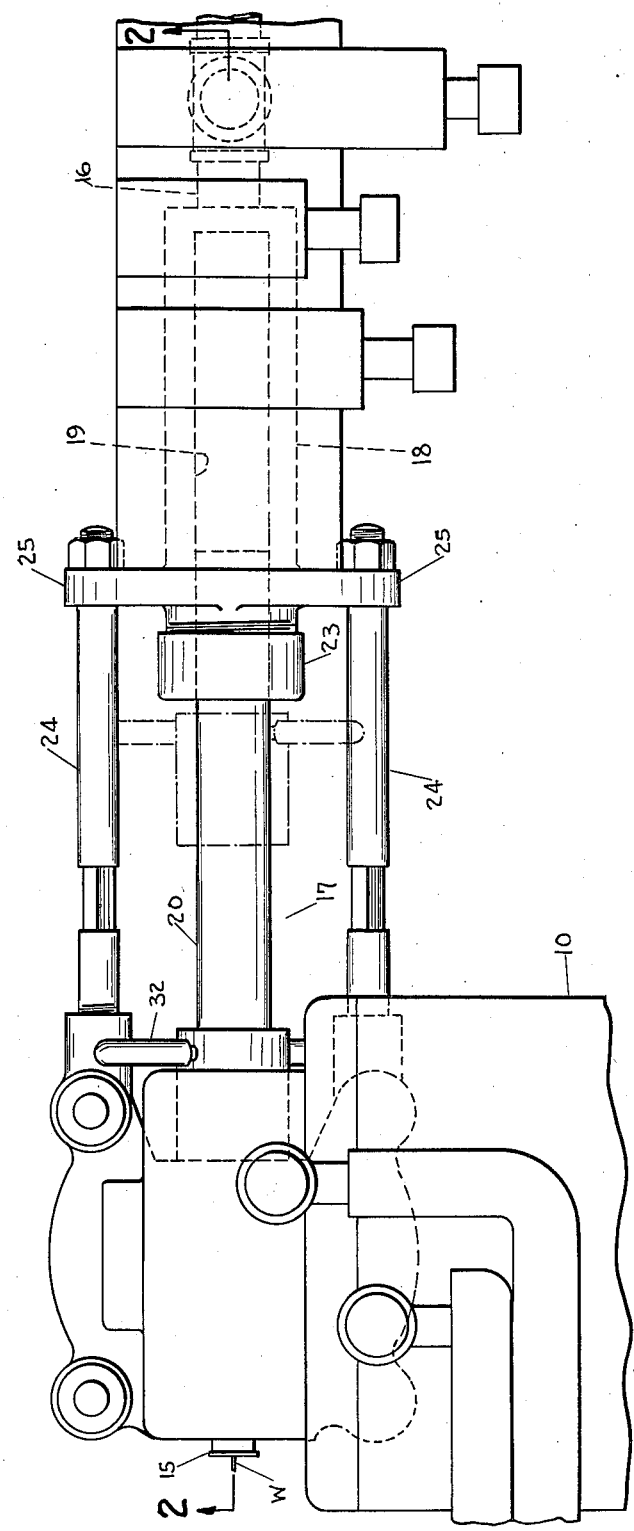

2,218,138

UNITED STATES PATENT OFFICE 2,218,138

APPARATUS FOR MANUFACTURING INSULATED WIRE OR THE LIKE

John R. Stricklen, Akron, Ohio, assignor to National Rubber Machinery Company, Akron, Ohio, a corporation of Ohio Application December 15, 1938, Serial No. 245,952

4 Claims. (Cl. 18—6)

This invention relates to apparatus for coating wire or the like with rubber or similar material, as for example in the manufacture of insulated wire.

The particular adaptation of the invention, subsequently to be described, essentially involves the use of an extruding machine from which rubber covered wire is continuously fed through a fluid sealed connector to a continuous vulcanizing chamber, the latter usually utilizing steam as a vuucanizing medium.

Due to the limited size of the opening in the wire guide used in the extruding die, it becomes necessary to form requisite splices in the wire to attach a new reel of wire to the end of a used reel at a point intermediate the extruder and the vulcanizing chamber. Heretofore, this has necessitated an operator first exhausting the steam from the vulcanizer, then removing a cover in a fluid sealing connector between the extruder and the vulcanizer, and then inserting his hands into the interior of the connector to make a splice in the wire. This, of course, has been a difficult, if not dangerous, operation due to the enclosed working space within the connector and to the intense heat retained within the connector even after the steam has been exhausted therefrom, it being understood that it is necessary to form the splice as quickly as possible to avoid over-curing the covered wire already in the vulcanizer, this wire usually being retained in the vulcanizer during the splicing operation, and to avoid under-curing part of the wire passing through the vulcanizer after the splice has been effected, due to cooling-down of the vulcanizer while the steam is off.

A general object of the invention is to provide in apparatus of the character described a simple, effective fluid sealing connector means adapted rapidly to be connected or disconnected exposing the wire whereby a splice or joint may be quickly and effectively made in the wire with a minimum interruption in the continuous operation of the extruding and vulcanizing equipment and consequently obviating production of stock containing over-cured or under-cured portions.

Another object of the invention is to provide connector means of the character described in which may be provided a substantial working space for making a splice without danger of burning the hands of the operator making the splice.

These and other objects will be manifest from the following brief description and the accompanying drawings.

Of the accompanying drawings:

Figure 1 is a fragmentary plan view illustrating the sealing connector embodying the invention, in operative position between an extruding machine and a continuous vulcanizer.

Figure 2 is a longitudinal cross-section taken substantially on line 2—2 of Figure 1.

Figure 3 is a view similar to Figure 1, with parts broken away and in section and the connector unit disconnected, illustrating the manner of forming a splice in wire being rubber coated.

Figure 4 is a cross-section taken on line 4—4 of Figure 3.

Referring to the drawings the numeral 10 designates a continuous extruding machine of known make having a head 11 in which is mounted an extruding die 12, unvulcanized plastic rubber R or the like being forced through an orifice 12a in the die by means of a driven screw 13. Wire W, supplied from reels (not shown) which may be fed continuously through an acid applicator 15 in head 11 for treating the wire to cause the rubber to adhere firmly thereto during vulcanization is guided from the applicator centrally through the wire guiding orifice 12a in die 12 to a continuous vulcanizer or vulcanizing tube 16 of known type, the vulcanizing medium therein usually being steam.

Obviously, it is necessary to provide a steam or fluid tight seal about the coated wire where it enters into the vulcanizing tube 16 to prevent escape of steam or other fluid at the point were the wire enters the tube. To this end there is provided a connector unit, indicated generally at 17, extending between the extruder 10 and vulcanizing tube 16.

Threaded or otherwise secured to the end of vulcanizer tube 16, which may be located a suitable distance away from the extruder 10, is a cylinder or stuffing-box 18 for slidably receiving in a bore 19 thereof a sleeve 20. Packing rings 21 for providing a fluid tight pressure seal between cylinder 18 and sleeve 20, may be adjustably retained in an enlarged bore 22 at the end of the cylinder by means of a suitable packing gland 23. The proper spacing of the extruder 10 and the end of vulcanizing tube 16 may be maintained by laterally spaced rods 24, 24, suitably connected at one end to the extruder, and at the other end to outwardly extending lugs 25, 25, on cylinder 18.

Sleeve 20 may be slidable toward and from the extruder head 11 and preferably is provided at the extruder end thereof with quickly releasable clamping means for connecting it in fluid-sealing relation about the extrusion orifice 12a. For this purpose the end of sleeve 20 may be enlarged at 26 and interiorly threaded, parts of this threaded portion preferably being cut out to provide a plurality of alternate longitudinal grooves 27, 27 between segmented thread portions 28, 28 (see Figure 4). An adapter 29, secured to extruder head 11 and having an opening therethrough in communication with the orifice 12 in head 11 may have a projecting nipple externally threaded and grooved for cooperation with the threaded and grooved portions of sleeve 20, the arrangement being such that the threaded segments of each cooperating part may be received in the grooved portions of the other to permit the end of the sleeve quickly to be slide into abutment with a flange 30 of the adapter 29. A gasket 31 may be provided on flange 30 to be engaged by the end of sleeve 20 to aid in obtaining a tight sealing connection. When the end of sleeve 20 is in abutment with gasket 31 the sleeve may be turned, by means of handles 32, 32 extending radially therefrom, to engage the respective threaded segments of sleeve 20 and nipple 29 with each other until the threads are in locking engagement against the yielding action of gasket 31 (see Figures 1 and 2). Similarly, this connection may be released to permit quickly sliding sleeve 20 to the position shown in Figure 3 to allow an operator to splice the trailing end of one roll of wire to the leading end of a new roll, as indicated at S (Figure 3).

In the operation of the apparatus for coating wire the sleeve is maintained, locked or clamped in sealing relation, as described, between tube 16 and extruder head 11 (see Figures 1 and 2), so that no vulcanizing fluid can escape from the vulcanizer where the wire W enters it. As the wire is progressively fed through the extruder orifice 12ª insulating material, such as rubber R in plastic form, is continuously extruded from the orifice to apply an even coating thereon. When it becomes necessary to form a splice in the wire, for instance when a new supply roll is being joined to the end of a roll which has been used up, the steam or other vulcanizing medium is first exhausted from the vulcanizer tube and then sleeve 20 is disconnected from adapter 29 and slid to the position thereof shown in Figure 3, the extruding machine also being inoperative while the splice is being made. This provides ample open space for an operator to form the required splice S with substantial freedom of movement, and without the usual danger of burning his hands by contact with parts of the connector heated by the vulcanizer or vulcanizing medium.

Obviously, with the apparatus just described a splice may be quickly formed without too long an interruption in the continuous operation thereof. It is highly advantageous to perform the splicing operation as quickly as possible to prevent over-curing coated wire remaining in the vulcanizing tube, the latter usually being of substantial length or under-curing a substantial quantity of coated wire going through the vulcanizer subsequent to making a splice.

Modifications of the invention may be resorted to without departing from the spirit thereof or the scope of the appended claims.

What is claimed is:

1. The combination with a continuous extruding machine for coating wire with rubber or like material, said extruding machine having an extrusion orifice, of a vulcanizer for progressive vulcanization of said coated wire as it passes from said orifice, said vulcanizer including a fixed casing substantially spaced from the extruding machine and a shiftable fluid-sealing connector casing for extending between the extruding machine and the fixed casing completely to enclose coated wire issuing from said extruding machine, means for mounting said connector casing whereby it may be bodily shifted longitudinally of the wire, and means for releasably securing the connector casing to the extruding machine to form a fluid-tight connection between the extruding machine and the fixed casing of the vulcanizer, whereby the connector casing may be quickly released and shifted completely to expose the wire in the space between the extruding machine and the vulcanizer freely to permit a wire splicing operation.

2. The combination comprising a continuous extruding machine for coating wire with rubber or like material, said extruding machine having an extrusion orifice, and a vulcanizer for progressively vulcanizing said coated wire as it passes from said orifice, said vulcanizer comprising a fixed casing and a fluid-sealing connector casing, a stuffing box on said fixed casing, said connector casing being slidably mounted in said stuffing box, and means for releasably connecting said connector casing to said extruding machine to provide a sealed conduit for completely enclosing the wire between said extruding machine and said fixed casing, said connector casing being releasable from the extruding machine and shiftable in said stuffing box to provide a substantial open space between the extruding machine and the vulcanizer and completely to expose the wire to permit an operator to form a splice in the exposed wire.

3. The combination comprising a continuous extruding machine for coating wire with rubber or like material, said extruding machine having an extrusion orifice, and a vulcanizer for progressively vulcanizing said coated wire as it passes from said orifice, said vulcanizer comprising a fixed casing and a fluid-sealing connector casing, a stuffing box on the end of said fixed casing, said connector casing being slidably mounted in said stuffing box, and bayonet joint means for releasably connecting said connector casing to said extruding machine to provide a sealed conduit for completely enclosing said wire between said extruding machine and said fixed casing, said connector being releasable and slidable in said stuffing box to provide an open space between the extruding machine and the vulcanizer completely to expose the wire and thereby permit an operator to form a splice in the wire exposed in said space.

4. In combination a continuous extruding machine for coating wire with rubber or the like and a vulcanizer for continuously curing the rubber on the wire, said vulcanizer including a fixed casing and a shiftable connector casing, a stuffing box in which the connector casing is slidably mounted, said stuffing box being secured on the end of said fixed casing through which said wire passes from the extruding machine, and means on said connector casing for releasably securing said connector casing to said extruding machine about the extrusion orifice thereof, whereby a fluid-sealing connection is provided by the shiftable connector casing between said extruding machine and said fixed casing in which connector casing the wire is completely enclosed, said connector casing being adapted to be slidably moved in said stuffing box to provide an open space completely exposing a length of wire between the extruding machine and vulcanizer for freely forming a splice in said wire.

JOHN R. STRICKLEN.